United States Patent
Wetzel et al.

(10) Patent No.: US 7,124,584 B1
(45) Date of Patent: Oct. 24, 2006

(54) SYSTEM AND METHOD FOR HEAT RECOVERY FROM GEOTHERMAL SOURCE OF HEAT

(75) Inventors: Todd Garrett Wetzel, Niskayuna, NY (US); Chellappa Balan, Niskayuna, NY (US); Charles Max Byrd, Redwood City, CA (US); Veera Palanivelu Rajendran, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/264,180

(22) Filed: Oct. 31, 2005

(51) Int. Cl.
*F03G 7/00* (2006.01)
(52) U.S. Cl. .................................... 60/641.2
(58) Field of Classification Search ............... 60/641.2, 60/641.3, 641.4, 641.5
See application file for complete search history.

(56) References Cited

U.S. PATENT DOCUMENTS

| | | | | |
|---|---|---|---|---|
| 4,132,075 A | * | 1/1979 | Fleck et al. ................ | 60/641.5 |
| 4,144,715 A | * | 3/1979 | Fleck et al. ................ | 60/641.3 |
| 4,189,923 A | * | 2/1980 | Berg .......................... | 60/641.5 |
| 4,201,060 A | * | 5/1980 | Outmans .................... | 60/641.2 |
| 4,319,626 A | | 3/1982 | Papazian et al. ............ | 165/1 |
| 5,272,879 A | * | 12/1993 | Wiggs ......................... | 60/676 |
| 5,656,172 A | * | 8/1997 | Kitz et al. ................... | 210/696 |
| 5,697,218 A | * | 12/1997 | Shnell ........................ | 60/641.2 |

OTHER PUBLICATIONS

W.G. Haije; J.B.J. Veldhuis; K. Brandwagt; J.W. Dijkstra; "Solid Sorption Based Heat Transformers Forapplication in Industrial Processes"; Accepted for publication in the 'Proceedings of the International Sorption Heat Pump Conference' Shanghai, Sep. 2002; 19 Pages.

* cited by examiner

*Primary Examiner*—Hoang Nguyen
(74) *Attorney, Agent, or Firm*—Fletcher Yoder

(57) ABSTRACT

A system is disclosed for generating energy from a geothermal heat source. The system includes a fluid injection system configured for injecting fluid into a subterranean formation and a fluid extraction system configured for extracting fluid from the subterranean formation after being heated by the formation. The system further includes a heat transformer configured to receive a first fluid heated by the geothermal heat source at a first temperature and adapted to heat a second fluid to a second temperature via a series of chemical reactions. Furthermore, the system includes an energy generation unit configured to receive heated the second fluid at the second temperature from the heat transformer to increase the temperature of a third fluid which is used to generate energy.

20 Claims, 4 Drawing Sheets

SYSTEM AND METHOD FOR HEAT RECOVERY FROM GEOTHERMAL SOURCE OF HEAT

BACKGROUND

The invention relates generally to a system and method for heat recovery from a geothermal source of heat, and in particular to a system and method for thermo-chemical heat energy transformation for hot dry rock heat source recovery applications.

Most of the world's energy requirements are currently met by nuclear power plants and fossil-based power plants. In recent years, gas-fired combined cycle plants have become popular due to their relatively lower capital investment requirements, and their ability to reduce emissions. While these and other types of power plants (e.g., hydro-electric facilities) currently meet the world's energy needs, they are, however, a subject of a strenuous environmental debate. Carbon dioxide emissions from gas and fossil-based power plants are speculated to be sources of global warming. The rapid consumption of gas and fossil-fuel reserves has led to numerous questions about the long-term sustainability of such resources. It is therefore desirable to develop sources of energy that are environmentally friendly, are easily available and are relatively independent of geopolitical uncertainties.

Geothermal energy harnesses the natural heat of the earth. The geothermal energy can be found in several forms, for example in hydrothermal reservoirs of steam or hot water trapped in rock; in the heat of the shallow ground, called as "earth energy"; in hot dry rock (HDR) found usually between 2.5 km or more, beneath earth's surface and at even shallower depths in areas of geologic activity; in magma, molten or partially molten rock, that can reach temperatures of upto 1200 C; and in geo-pressurized brine that are found 3.0 to 6.0 kilometer (km) below the earth's surface. Geothermal energy has been used in power generation for many years, but typically at locations emanating hot fluids, typically water and steam. The much more abundant HDR locations and other geothermal locations which provide low grade heat have not been very successfully developed. As in most power generation facilities, whether wet or dry, heat from geothermal formations is used to produce steam, and the steam, in turn, is used to drive a steam turbine coupled to a generator operable to produce electricity.

Typically, heat is extracted from the geothermal source by pumping water under high pressure through a reservoir. The water is pumped into the reservoir through a supply well. Water or steam is removed from the reservoir through a return well. The water is heated by the geothermal source, for example HDR as it passes through the reservoir from the supply well to the return well. From the production well, the water is returned to the surface where its useful thermal energy may be extracted. The water may be re-circulated back to the reservoir to mine more heat.

Typically, the temperature of the carrier fluid (water in the above example) determines how the geothermal energy can be used the hotter the fluid, the grater the range of possible applications. For example, the temperature of heat energy from the HDR source is in the range of 150–250 C, depending upon the quality of steam extracted. However, such HDR layers typically exist only at deeper levels, typically at depths of 2.5 km or more. Consequently, investment costs tend to be much higher for HDR facilities. Such facilities could be made more cost-effective, if energy could be more efficiently extracted from the returned, heated water and steam. Such gains in efficiency could help to offset the initial investment in drilling and development of the HDR or any other geothermal energy production facility.

Accordingly, there is a need for a technique that enables recovery of energy from the geothermal source by aiding in offsetting drilling and the associated costs, and increasing efficiency of energy extraction.

BRIEF DESCRIPTION

The present technique accordingly provides a novel approach to address the aforementioned problems. In one aspect of the present technique, a system for generating energy from a geothermal heat source is provided. The system includes a fluid injection system adapted for injecting fluid into a subterranean formation and a fluid extraction system adapted for extracting fluid from the subterranean formation after being heated by the formation. The system further includes a heat transformer adapted to receive the first fluid from the geothermal source at a first temperature and configured to heat a second fluid to a second temperature. In another aspect of the present technique, the system for generating energy from a geothermal source also includes an energy generation unit configured to receive the second fluid at the second temperature from the heat transformer to increase the temperature of a third fluid, which is used to generate energy.

Another aspect of the present technique is a method for utilizing heat from a geothermal source of heat for producing energy. The method includes extracting heat from the geothermal source of heat using a first fluid and transferring heat from the first fluid to a second fluid disposed within a heat transformer. The method further includes raising temperature of the second fluid in the heat transformer and producing a vapor of the second fluid; and transferring heat from the vapor of the second fluid to a third fluid disposed in an energy generation unit; and producing energy using the heated third fluid.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
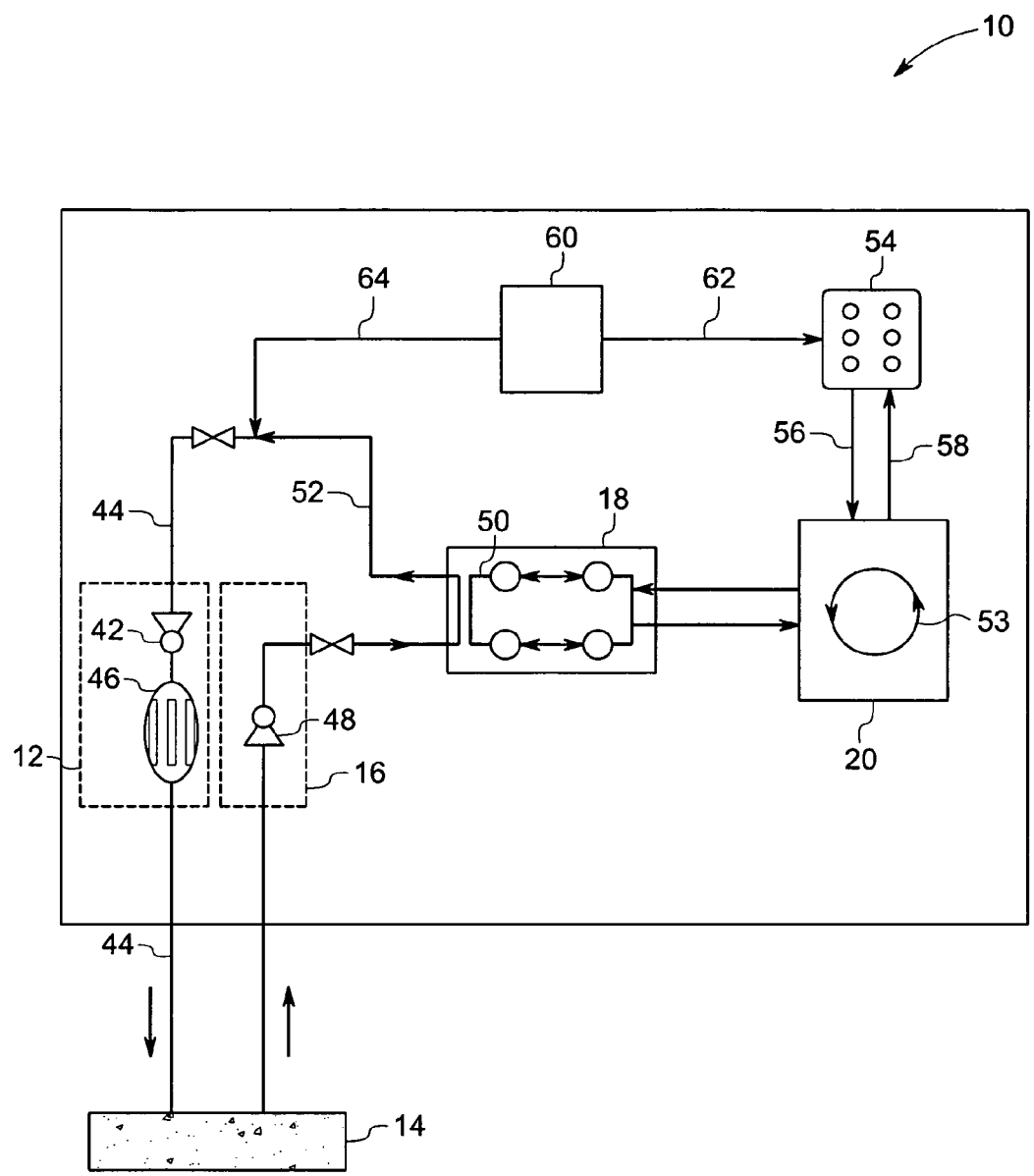
FIG. 1 is a diagrammatical view of a system for generating energy from a geothermal source using a heat transformer and an energy generation unit, in accordance with an aspect of the present technique.

FIG. 1 is a block diagram of a system 10 illustrating various functional components adapted for generating energy from a geothermal source, for example, but not limited to a hot dry rock (HDR) heat source 14, in accordance with aspects of the present technique. HDR heat source has been used as an exemplary geothermal source for ease of illustration only, it should be noted that the aspects of the technique will be equally applicable to other geothermal sources and specifically to geothermal sources yielding low or medium grade heat. It may also be noted that the terms "geothermal heat source" and "geothermal source of heat" are used interchangeably throughout the text and carry the same meaning. Likewise, the terms "HDR source of heat" and "HDR heat source" are used interchangeable and carry the same meaning.

The system 10 further includes a fluid injection system 12, and a fluid extraction system 16. The fluid injection system 12 includes an injection pump 42 adapted to inject the first fluid 44 into the subterranean formation of earth for extracting heat from the HDR heat source 14. Subterranean formation of earth may be defined as a geothermal source of heat naturally available underneath the earth's crust. The fluid injection system 12 may additionally include a filter 46 for filtering any contaminants of the first fluid 44. The fluid extraction system 16 includes an extraction pump 48 adapted for extracting heat from HDR heat source 14 via the first fluid 44 at a first temperature (usually less than 100 C).

It should be noted that the first fluid that flows through the earth's crust can be any fluid or fluidized media that may be capable of absorbing heat rapidly from the HDR heat source 14. The first fluid may comprise a fluidized solid, a liquid or a gas. Typically, the first fluid, which may comprise water in one example, may be supplied through an inlet conduit drilled to access the HDR heat source 14 of the earth's crust. The inlet conduit may be drilled into the ground through a supply well. The area comprises porous rock, which is referred to as dry rock, and does not interfere with water aquifers. This porous, and often fractured rock, when combined with water introduced via the supply well, forms a porous heat exchanger with the dispersed heat transfer area sometimes covering several cubic kilometers. Another well may be drilled in the fractured rock and operates as a return well. The first fluid that is pumped down to the hot dry rock via the supply well may be heated by contacting the hot dry rock, following which it is drawn through the return well to the ground level via a fluid extraction system 16.

In an implementation of the present technique, low-grade heat may be extracted from the HDR heat source 14 or any other geothermal source at depths of about 1.5 km to 2.0 km. This is advantageous over the conventional technique of recovering heat from HDR source of heat, which requires drilling at greater depths in the range of about 2.5 km to 3.0 km. This enables the system to increase the efficiency of the energy generation by utilizing low-grade heat, thereby saving cost.

Referring back to FIG. 1, the heat from the first fluid 44 may be utilized in a heat transformer 18 to initiate a series of chemical reactions which in turn increase the temperature of a second fluid 50 in the heat transformer 18. The heat transformer 18 is thus adapted to heat a second fluid to a second temperature (usually in the range of about 200 C to about 250 C). The second fluid 50 is the working fluid in the heat transformer 18. It should be noted that the second fluid may be any suitable heat transfer medium, such as ammonia, alcohol, water, carbon dioxide, hydrogen, amine, sebacate, phthalate, aldehydes, formamide, ketone, acetonitrile, sulfoxide, sulfone, acetate, amide, or a combination thereof.

The heat transformer 18, in an exemplary embodiment is a chemical heat transformer. The heat transformer 18 typically includes one or more salt complexes or metallic salts.

The working of the heat transformer 18 is explained in more detail with reference to FIG. 2. In one example, after the heat is transferred from the first fluid 44 to the heat transformer 18, the first fluid 44 may be returned back to the fluid injection system 12 for re-circulating as indicated by arrow 52.

Furthermore, in some embodiments, the system 10 includes an energy generation unit 20 configured to receive the second fluid 50 at the second temperature from the heat transformer 18 and heat a third fluid 53, wherein the third fluid may be used in the energy generation unit 20 to produce power. The energy generation unit 20 may implement a Rankine cycle, a thermo chemical energy recovery cycle (TCER), or an organic Rankine cycle for generating energy. It should be however noted that though reference is made to the above mentioned energy cycles, which are explained briefly herein below, as will be appreciated by those skilled in the art, other energy cycles may also be applicable to generate energy using the present technique.

In an exemplary embodiment, a system implementing the Rankine cycle may be employed to utilize the high-grade heat from the chemical heat transformer 18. The Rankine cycle may be implemented by using a turbine, a condenser, a pre-heater and a condensate pump. The heated third fluid may be expanded through the turbine to produce work. For an impulse turbine, the flow may be expanded through a stator or through nozzles. Vapor leaving the turbine would enter the condenser where heat may be removed until the vapor is condensed to a liquid state. Saturated liquid may be then delivered to the condensate pump, which raises the pressure of the liquid and delivers it back to the pre-heater from where the cycle then repeats. In the pre-heater the compressed fluid may be converted to a superheated vapor at constant pressure. A first portion of the vapor may be transferred back to the heat transformer 18 and a second portion of vapor may be returned back to the fluid injection system 12 for injecting into the HDR heat source 14.

In another embodiment, the energy generation unit 20 may include a piston that may be in reciprocatory slideable communication with a cylinder. The expansion of the third fluid promotes a reciprocatory motion of the piston within the cylinder. This reciprocatory motion may be converted into rotary motion, which may be then converted into electrical energy via a generator.

In yet another embodiment a TCER cycle may be implemented in the energy generation unit 20. In this example, the heat from the second fluid in the heat transformer 18 is transferred to an ammoniated salt of the TCER cycle. The TCER cycle, in one example, employs a generator and absorber with a power generator unit between the two. The heat input to the generator produces ammonia at high pressure which is used to produce work in a turbine or a reciprocating engine, and the low pressure and lower temperature ammonia from the exhaust of the power generator unit is absorbed in the absorber rejecting heat to the ambient. This rejected heat may be used for cooling water also. If this heat is rejected from the TCER cycle is at sufficiently high enough temperature similar to the temperature of the heated water coming from the geothermal source, it could be recycled to and from the heat transformer, thus increasing the efficiency of the entire system.

A suitable third fluid may be a liquid or gas that has a dipole moment and may also be capable of undergoing covalent bond-breaking reactions. Suitable third fluids are polar protic solvents and dipolar aprotic solvents. Examples of suitable third fluids are ammonia, alcohols (e.g., methanol, ethanol, butanol); water; carbon dioxide; hydrogen;

amines (e.g., pyrrole, pyridine, methyl amine, dimethyl amine, trimethyl amine); ethers; glycols; glycol ethers; sebacates; phthalates (e.g., diethylhexylphthalate (DEHP), monoethylhexylphthalate (MEHP), dimethylphthalate (DMP), butylbenzylphthalate (BBP), dibutylphthalate (DBP), dioctylphthalate(DOP)); aldehydes (e.g., acetaldehydes, propionaldehydes), formamides (e.g., N, N-dimethylformamide); ketones (e.g., acetone, methyl ethyl ketone, β-bromoethyl isopropyl ketone); acetonitrile; sulfoxides (e.g., dimethylsulfoxide, diphenylsulfoxide, ethyl phenyl sulfoxide); sulfones (e.g., diethyl sulfone, phenyl 7-quinolylsulfone); thiophenes (e.g., thiophene 1-oxide); acetates (e.g., ethylene glycol diacetate, n-hexyl acetate, 2-ethylhexyl acetate); amides (e.g., propanamide, benzamide) or the like, or a combination comprising at least one of the foregoing fluids. Referring to the different energy cycles, the third fluid could also be steam in the case of Rankine cycle, ammonia in TCER cycle and Kalina cycle, and hydrocarbon fluids in Organice Rankine cycle.

Referring back to FIG. 1, the system 10 may additionally include in one example, a cooling tower 54, which provides cooling water 56 to the energy generation unit 20 for cooling the vapor generated during the energy generation. The heated water 58 returns back to the cooling tower 54. The cooling water lost during this process may be replenished by supplying water from the source of cooling water 60 (generally referred to as "make up water"). Where the first fluid is water, the source of cooling water 60 may also provide water to the fluid injection system 12 that re-injects water 64 to the HDR heat source 14.

Figure 2:
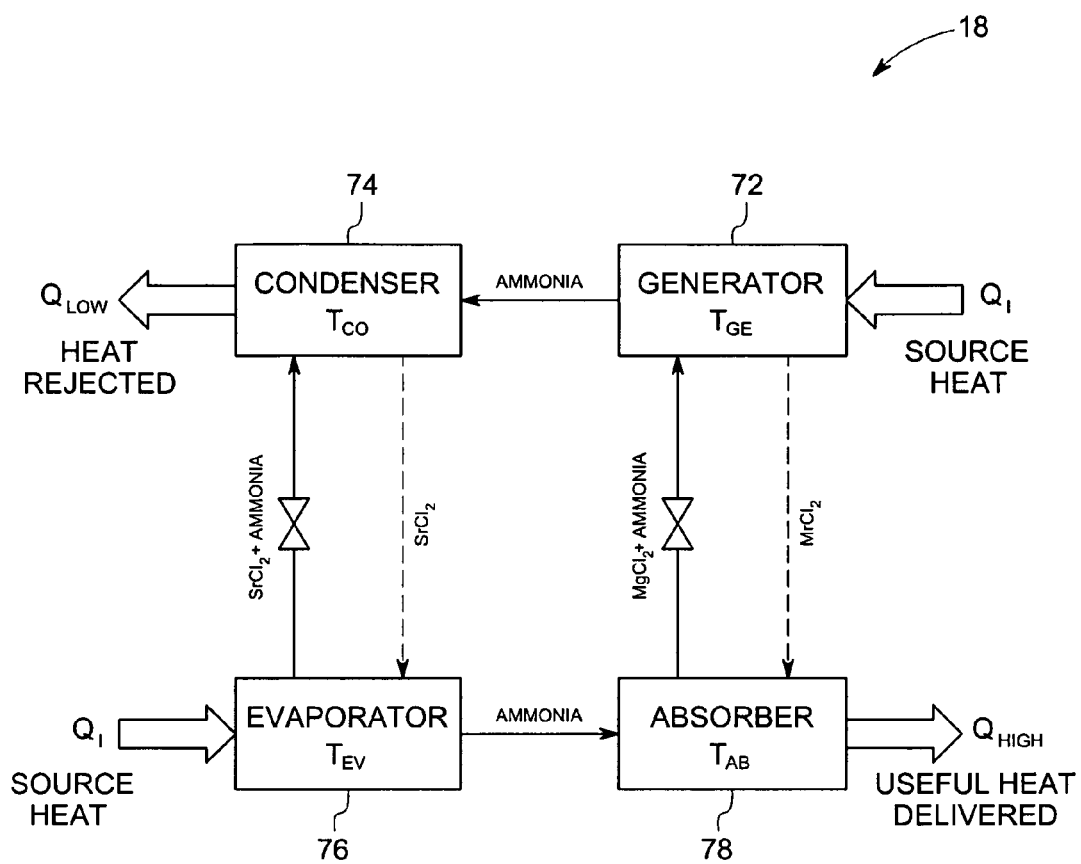
FIG. 2 is a diagrammatical view a chemical heat transformer for use in the system of FIG. 1, in accordance with an aspect of the present technique.

FIG. 2 illustrates a diagrammatical view of an exemplary chemical heat transfer 18 and the thermo-chemical interactions in the chemical heat transformer 18. The heat transformer 18 includes a generator 72, a condenser 74, an evaporator 76 and an absorber 78. The salt complexes or metallic salts in generator 72 and the evaporator 76 are in associated states (fully absorbed), whereas the salts in condenser 74, and the absorber 78 are in disassociated states (fully desorbed).

In an exemplary embodiment, the working fluid (second fluid 50) in the chemical heat transformer is ammonia, and is capable of thermally reversible association and dissociation with the metallic salts in the chemical heat transformer 18. The association may include absorption, adsorption, chemisorption, or the like, or a combination comprising at least one of the foregoing, and generally occurs when heat is removed from the first fluid. The dissociation may include desorption, the breaking of bonds formed in chemisorption, or the like, or a combination comprising at least one of the foregoing and occurs when heat is supplied via the first fluid as explained in reference to FIG. 1.

In an exemplary embodiment, the low or medium grade heat at about 125 C-150 C (Q1) from the geothermal source via a first fluid may be inputted into the evaporator 76. The evaporator 76 may contain a first inorganic salt having a lower equilibrium temperature, for example strontium chloride ($SrCl_2$). $SrCl_2$ is in fully ammoniated condition, that is, it has already absorbed maximum amount of ammonia. The heat inputted into the evaporator 76 heats the ammoniated $SrCl_2$ such that ammonia is expelled at a moderate temperature. The ammonia from the evaporator 76 is delivered to the absorber 78 containing a second salt, for example magnesium chloride ($MgCl_2$). The second salt has a higher equilibrium temperature than the first salt. Additionally, the second salt has ammonia deficit. When the ammonia from the evaporator 76 comes in contact with the salt, $MgCl_2$ in the absorber 78, the $MgCl_2$ absorbs ammonia, releasing heat at a higher temperature of about 220 C ($Q_{high}$). To complete the cycle the salts are returned to their original ammoniated state, in the following manner in one example. The $MgCl_2$ from the absorber 78 is transported to a generator 72 operating at a lower pressure. At a lower pressure, $MgCl_2$ can desorb ammonia at a low temperature. Heat (Q1) may be added from the geothermal source to drive off ammonia in the generator 72 and $MgCl_2$ is returned in its original state to the absorber 78. The desorbed ammonia is passed from the generator 72 to the condenser 74 operating at a lower pressure than the absorber 78. The condenser 74 also contains de-ammoniated $SrCl_2$ salts from the evaporator 76. $SrCl_2$ absorbs ammonia in the condenser 74 and releases low temperature heat ($Q_{low}$). The ammoniated $SrCl_2$ is transported back to the evaporator 76 for another cycle. The chemical heat transformer may be operated in continuous mode as explained above or in traditional batch mode. The salt complex pair used is just exemplary and many other combinations of salt complex pairs may be used for example but not limited to manganese sulphate ($MnSO_4$) and Nickel Chloride ($NiCl_2$).

Thus the cycle takes medium grade heat and converts part of that energy into high-grade heat and low-grade heat. The efficiency of the chemical heat transformer is simply the amount of desired heat, over input heat. In an exemplary embodiment, the efficiency of the chemical heat transformer varied from 0.3 to 0.5. Thus the aspects of the present technique as explained above use the heat transformer at the source of the geothermal energy coming out of the ground to raise the temperature to a higher temperature so that cycle efficiency can be improved. It is estimated more energy (at a lower temperature) needs to be supplied when using a heat transformer than without the heat transformer (baseline). This translates into either drilling hole with higher energy flow rate (bigger size hole) or drilling more holes of the baseline size. But this additional cost is easily offset by the reduction in drilling cost (to a lower depth) by use of a chemical heat transformer. Preliminary estimates showed that a 70 to 80% reduction in drilling cost occurs when a chemical heat transformer is used. An efficiency of 40% was assumed for heat transformer efficiency.

The high-grade heat may be transferred from the chemical heat transformer 18 to an integrated organic Rankine cycle or a TCER cycle or a Rankine cycle, which will operate at improved efficiency due to the higher temperature heat from the chemical heat transformer 18. For example, in a TCER cycle the high-grade heat from the chemical heat transformer 18 can be subsequently used to increase the temperature of a third fluid still further by the released heat from the chemical heat transformer. And the heated third fluid can be employed to produce useful mechanical work. Since both, the chemical heat transformer and TCER work on similar thermo-chemical principles, synergies between chemical heat transformer and TCER advantageously help to bring down the cost and size of the overall plant.

Figure 3:
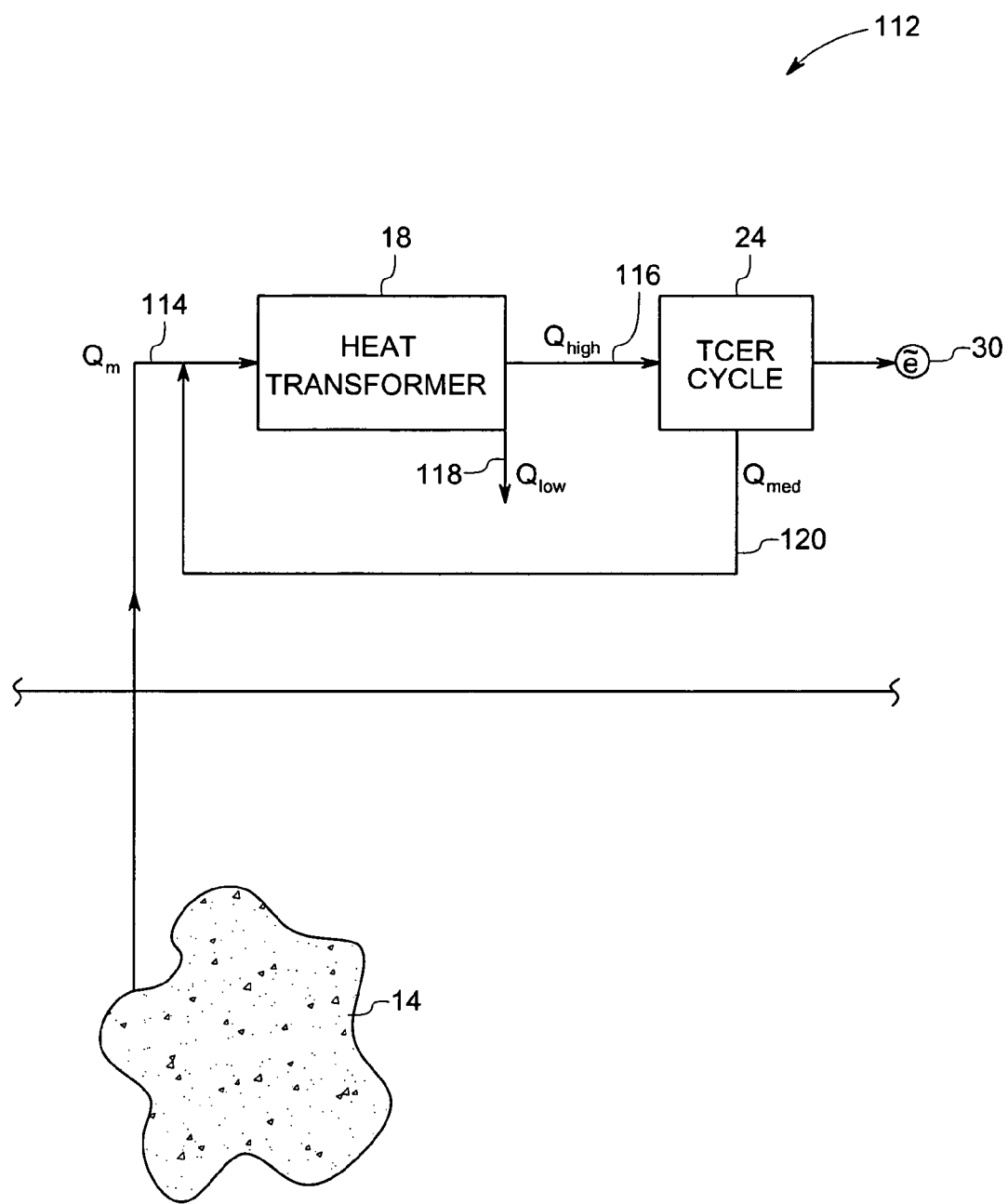
FIG. 3 is a diagrammatical view of a system for generating energy from a geothermal source using a heat transformer coupled to an energy generation unit using a feedback path/loop from the energy generation unit to the heat transformer.

FIG. 3 is a diagrammatical view of a system 112 for generating energy from a HDR heat source 14 using the heat transformer 18 coupled to the TCER cycle 24. In the illustrated embodiment, the heat extracted ($Q_m$) 114 from the HDR heat source 14 via the first fluid is used in the heat transformer 18 for increasing the temperature of the second fluid represented by $Q_{high}$ 116. The low-grade heat ($Q_{low}$) 118 generated from the heat transformer 18 may be used in a separate cycle for desalinating water or for heating and cooling of buildings. The $Q_{high}$ 116 may be utilized in the TCER cycle 24 for generating energy 30. In one aspect of the present technique, the TCER cycle 24 may be disposed downstream of the heat transformer 18 and may be adapted to generate energy. The medium grade heat ($Q_{med}$) 120 released from the TCER cycle 42 may be transferred back to the heat transformer 18 for recirculation of the medium grade heat ($Q_{med}$) 120.

Figure 4:
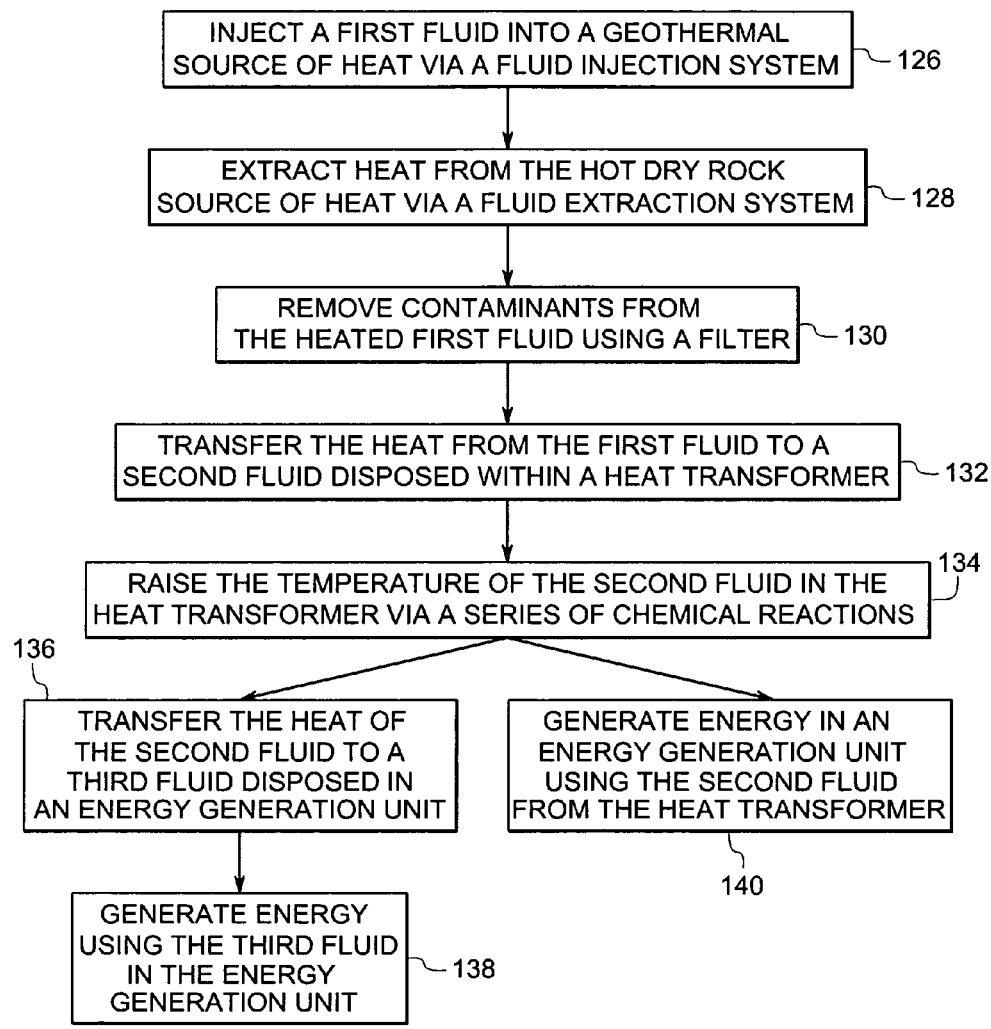
FIG. 4 is a flow diagram illustrating exemplary steps involved in the generation of energy from a geothermal source.

FIG. 4 is a flow diagram illustrating exemplary steps involved in the generation of energy from a geothermal heat source, for example, a hot dry rock (HDR) heat source. In the illustrated embodiments, a first fluid may be injected into a geothermal heat source via the fluid injection system as indicated in step 126. As explained in earlier sections above, the fluid injection system includes an injection pump, which pumps the first fluid into the geothermal heat source. At step 128, the heat from the geothermal heat source is extracted via the fluid extraction system. The heat from the geothermal heat source is extracted via the first fluid and that is pumped using an extraction pump. The heated first fluid generally contains various contaminants, which are removed using a filter as indicated in step 130. At step 132, the heat from the first fluid is transferred to a second fluid disposed in a heat transformer.

As explained earlier the heat transformer performs a series of chemical reactions to increase the temperature of the second fluid (block 134). At step 136, the heat of the second fluid is transferred to a third fluid, wherein the third fluid may be disposed in the energy generation unit. At step 138, the third fluid is used to generate energy in the energy generation unit. Alternately, the heated second fluid may be directly used to generate energy using the energy generation unit as indicated in step 140.

As mentioned earlier, any other geothermal source of heat may as well be employed. The overall technique as explained in reference to FIG. 1–FIG. 4 remains the same with the exception that a fluid injection system and a first fluid as described herein above may or may not be used. The heat may be extracted from these geothermal sources using known techniques in an open loop or in a closed loop in the form of pressurized vapors using a separator for extracting water particles and non-needed chemicals from the vapor. The residual water and the chemicals may be returned to the earth through a re-injection well and water canals.

As will be appreciated, the present technique provides a variety of benefits over the conventional geothermal heat recovery systems. The present technique enables recovery of heat from the geothermal heat source by reducing the drilling depths and the associated costs, and increasing efficiency of energy extraction. Moreover, even for the same well depth, the higher quality heat produced permits energy to be extracted more efficiently, thereby permitting better recuperation of investment in the drilling of well and set-up of the entire energy generation system. Thus, the low-grade heat from the geothermal heat source may be used effectively to generate energy using the energy generation unit. The waste heat from the system can be used to desalinate water (using heat driven separation process) and/or used for process heating and can also be integrated to produce combined heating and cooling. In effect, the geothermal heat energy can be harnessed more efficiently to produce electricity, water, heating and cooling.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for generating energy from a geothermal source of heat, comprising:
   a fluid injection system configured to inject a first fluid into a subterranean formation;
   a fluid extraction system configured to extract the first fluid from the subterranean formation after being heated by the formation; and
   a heat transformer configured to receive the first fluid from the subterranean formation at a first temperature, wherein the heat from the first fluid initiates a series of chemical reactions in the heat transformer resulting in heating a second fluid in the heat transformer to a second temperature.

2. The system of claim 1, wherein the heat transformer comprises one or more salt complexes, and wherein the heat transformer is operable to dissociate the one or more salt complexes using the heat from the first fluid to raise temperature of the second fluid to a second temperature.

3. The system of claim 1, wherein the heat transformer comprises one or more salt complexes, and wherein the heat transformer is operable to dissociate the one or more salt complexes causing the second fluid to generate vapor.

4. The system of claim 1, wherein the heat transformer comprises a chemical heat transformer.

5. The system of claim 4, wherein the chemical heat transformer comprises:
   an evaporator comprising a first salt complex in an associated state, and configured to receive the heat from the first fluid at the first temperature to disassociate the salt complex and release the second fluid;
   an absorber comprising a second salt complex in a disassociated state, and wherein the second salt complex absorbs the second fluid released from the evaporator to release heat which increases the temperature of second fluid to the second temperature;
   a generator comprising the second salt complex in the associated state and configured to replenish the second salt complex in the absorber; and
   a condenser comprising the first salt complex in the disassociated state, and configured to replenish the first salt complex in the evaporator.

6. The system of claim 4, wherein the first and second salt complexes comprise strontium chloride and magnesium chloride respectively or manganese sulphate and nickel chloride respectively.

7. The system of claim 1, wherein the first fluid comprises water.

8. The system of claim 1, wherein the first temperature ranges from about 100 C to about 150 C.

9. The system of claim 1, wherein the second fluid is ammonia, an alcohol, water, carbon dioxide, hydrogen, an amine, a sebacate, a phthalate, an aldehydes, a formamide, a ketone, acetonitrile, a sulfoxide, a sulfone, an acetate, an amide, or a combination thereof.

10. The system of claim 1, wherein the second temperature ranges from about 200 C to about 250 C.

11. The system of claim 1, wherein the subterranean formation is a hot dry rock heat source located at a depth of greater than about 1000 meters below the surface of the earth.

12. The system of claim 1 further comprising an energy generation unit configured to receive the second fluid at the second temperature from the heat transformer and adapted to heat a third fluid, wherein heated third fluid is used to generate energy.

13. The system of claim 12, wherein the energy generation unit employs a thermo chemical energy recovery cycle, an organic Rankine cycle, a Rankine cycle or combinations thereof.

14. The system of claim 13, wherein the energy generation unit employing the thermo chemical energy recovery cycle comprises one or more salt complexes for generating high pressure energy and wherein the energy generation unit is operable to extract heat from the second fluid at the second temperature.

15. The system of claim 13, wherein the energy generation unit is operable to feedback the rejected heat from thermo chemical energy recovery cycle to the heat transformer to improve efficiency of the system.

16. A system for generating energy from a hot dry rock source of heat, comprising:
  a heat transformer configured to receive a first fluid at a first temperature extracted from the hot dry rock source and adapted to heat a second fluid to a second temperature; and
  a thermo chemical energy recovery system configured to receive the second fluid at the second temperature from the heat transformer and heat a third fluid, the heated third fluid being used to generate energy,
  wherein the heat transformer comprises one or more salt complexes, and wherein the heat transformer is operable to disassociate one or more salt complexes causing a raise in temperature of the second fluid.

17. A system for generating energy from a geothermal source of heat, comprising:
  a heat transformer configured to receive a first fluid from the subterranean formation at a first temperature and adapted to heat a second fluid to a second temperature; and
  an energy generation unit configured to receive the second fluid at the second temperature from the heat transformer to heat a third fluid in the energy generation unit, wherein the heated third fluid is utilized to generate energy,
  wherein the heat transformer comprises one or more salt complexes, and wherein the heat transformer is operable to disassociate one or more salt complexes causing a raise in temperature of the second fluid.

18. A system for generating energy from a geothermal source of heat, comprising:
  a chemical heat transformer configured to receive a first fluid at a first temperature extracted from the geothermal source and adapted to heat a second fluid to a second temperature via a series of chemical reactions; and
  a thermo chemical heat recovery system configured to receive the second fluid at the second temperature from the heat transformer to heat a third fluid, the heated third fluid being used to generate energy.

19. A method for utilizing heat from a geothermal source of heat for producing energy, comprising:
  extracting heat from the geothermal source of heat using a first fluid;
  transferring heat from the first fluid to a second fluid disposed within a heat transformer;
  raising temperature of the second fluid in the heat transformer and producing a vapor of the second fluid; and
  transferring heat from the vapor of the second fluid to a third fluid disposed in an energy generation unit; and
  producing energy using the heated third fluid,
  wherein raising the temperature of the second fluid occurs by dissociating one or more salt complexes using the heat from the first fluid.

20. The method of claim 19, further comprising using the heated third fluid for contacting a rotating device to produce energy.

* * * * *